US012692123B2

(12) United States Patent
Varelius

(10) Patent No.: US 12,692,123 B2
(45) Date of Patent: Jul. 28, 2026

(54) METHOD AND AN APPARATUS FOR TRANSMITTING AN ELEVATOR CALL

(71) Applicant: KONE Corporation, Helsinki (FI)

(72) Inventor: Ari Varelius, Helsinki (FI)

(73) Assignee: KONE CORPORATION, Helsinki (FI)

( * ) Notice: Subject to any disclaimer, the term of this patent is extended or adjusted under 35 U.S.C. 154(b) by 993 days.

(21) Appl. No.: 17/941,191

(22) Filed: Sep. 9, 2022

(65) Prior Publication Data

US 2023/0002188 A1 Jan. 5, 2023

Related U.S. Application Data

(63) Continuation of application No. PCT/FI2020/050229, filed on Apr. 7, 2020.

(51) Int. Cl.
*B66B 1/46* (2006.01)
*B66B 1/34* (2006.01)

(52) U.S. Cl.
CPC ............ *B66B 1/468* (2013.01); *B66B 1/3461* (2013.01); *B66B 2201/4638* (2013.01); *B66B 2201/4653* (2013.01)

(58) Field of Classification Search
CPC .................. B66B 1/468; B66B 1/3461; B66B 2201/4638; B66B 2201/4653
See application file for complete search history.

(56) References Cited

U.S. PATENT DOCUMENTS

| | | | | |
|---|---|---|---|---|
| 6,209,685 | B1 * | 4/2001 | Zaharia | B66B 1/468 187/388 |
| 9,771,241 | B2 * | 9/2017 | Varelius | B66B 5/0018 |
| 11,332,341 | B2 * | 5/2022 | Huang | B66B 1/468 |
| 12,145,580 | B2 * | 11/2024 | Grochowicz | G08G 1/148 |
| 12,195,302 | B2 * | 1/2025 | Roussel | B66B 13/22 |
| 12,214,992 | B2 * | 2/2025 | Fumiya | B66B 1/468 |
| 2009/0028674 | A1 * | 1/2009 | Woo | E04H 1/04 414/228 |
| 2015/0314987 | A1 * | 11/2015 | Varelius | B66B 19/00 187/334 |
| 2017/0088397 | A1 * | 3/2017 | Buckman | B66B 1/3461 |
| 2019/0002237 | A1 * | 1/2019 | Scoville | B66B 1/468 |
| 2019/0047817 | A1 * | 2/2019 | Salmikuukka | B66B 1/468 |

(Continued)

FOREIGN PATENT DOCUMENTS

| | | | | |
|---|---|---|---|---|
| CN | 115515879 A * | 12/2022 | | B66B 1/468 |
| EP | 3 312 123 A1 | 4/2018 | | |

(Continued)

OTHER PUBLICATIONS

International Search Report, issued in PCT/FI2020/050229, dated Jan. 14, 2021.

(Continued)

*Primary Examiner* — Michael A Riegelman
(74) *Attorney, Agent, or Firm* — Birch, Stewart, Kolasch & Birch, LLP

(57) ABSTRACT

According to an aspect, there is provided a method and an apparatus for transmitting an elevator call. In the solution, a predetermined triggering event associated with a status of a vehicle is identified and transmission of the elevator call is caused based on the predetermined triggering event associated with the status of the vehicle.

24 Claims, 4 Drawing Sheets

(56) References Cited

U.S. PATENT DOCUMENTS

| | | | | |
|---|---|---|---|---|
| 2019/0193988 | A1* | 6/2019 | Huang | B66B 1/468 |
| 2020/0270095 | A1* | 8/2020 | Fumiya | B66B 1/3461 |
| 2022/0242693 | A1* | 8/2022 | Saleh | A61B 5/01 |
| 2023/0002188 | A1* | 1/2023 | Varelius | B66B 1/3461 |
| 2023/0092565 | A1* | 3/2023 | Varelius | B66B 1/3461 187/247 |
| 2023/0271806 | A1* | 8/2023 | Belov | B66B 1/3492 187/380 |
| 2023/0271807 | A1* | 8/2023 | Belov | B66B 3/006 187/388 |
| 2025/0214807 | A1* | 7/2025 | Sorsa | B66B 1/2408 |

FOREIGN PATENT DOCUMENTS

| | | | | |
|---|---|---|---|---|
| EP | 3833624 | B1 * | 7/2025 | G05D 1/226 |
| KR | 10-2007-0005277 | A | 1/2007 | |
| WO | WO 2008/116963 | A1 | 10/2008 | |
| WO | WO 2019/106801 | A1 | 6/2019 | |
| WO | WO 2020/030845 | A1 | 2/2020 | |

OTHER PUBLICATIONS

Written Opinion of the International Searching Authority, issued in PCT/FI2020/050229, dated Jan. 14, 2021.

* cited by examiner

METHOD AND AN APPARATUS FOR TRANSMITTING AN ELEVATOR CALL

CROSS REFERENCE TO RELATED APPLICATIONS

This application is a Continuation of PCT International Application No. PCT/FI2020/050229, filed on Apr. 7, 2020, which is hereby expressly incorporated by reference into the present application.

BACKGROUND

An elevator call is usually made when a passenger arrives at an elevator lobby and presses a landing call button or makes a destination call. Depending on the size of the building in question, it may take some time while the elevator is able to server the passenger's elevator call. It may also be possible to make an elevator call, for example, a destination call, beforehand if the passenger is able to use a mobile device application that enables the passenger to make the elevator call remotely.

Sometimes, however, it may be difficult to make the elevator call beforehand so that the elevator would ready when arriving at the elevator lobby. This may be, for example, when a passenger arrives to a garage by a car, unloads shopping bags from the car and starts to walk towards the elevators.

Therefore, new and easy ways for making an elevator call are required, especially in situations when its it difficult for a passenger to manually make the elevator call.

SUMMARY

According to a first aspect, there is provided a method for transmitting an elevator call. The method comprises identifying a predetermined triggering event associated with a status of a vehicle, and causing transmission of the elevator call based on the predetermined triggering event associated with the status of the vehicle.

In an implementation form of the first aspect, the predetermined triggering event comprises a disconnection of a wireless connection between a mobile device and a vehicle system.

In another implementation form of the first aspect, the predetermined triggering event comprises a change in a locking status of doors of the vehicle.

In another implementation form of the first aspect, the predetermined triggering event comprises information identifying an arrival of the vehicle to a parking space.

In another implementation form of the first aspect, the information identifying the arrival of the vehicle to the parking space comprises information originating from a weighing arrangement.

In another implementation form of the first aspect, the method further comprises obtaining information identifying the number of passengers associated with the vehicle, and wherein causing transmission of the elevator call comprises causing transmission of the elevator call based on the predetermined triggering event associated with the vehicle and the information identifying the number of passengers associated with the vehicle.

In another implementation form of the first aspect, the method further comprises obtaining information identifying the number of passengers, and wherein causing transmission of the elevator call comprises causing transmission of the elevator call based on the predetermined triggering event associated with the vehicle and the information identifying the number of passengers.

In another implementation form of the first aspect, the method further comprises obtaining information indicative of a location; and wherein causing transmission of the elevator call comprises causing transmission of the elevator call based on the information indicating of the location and the predetermined triggering event associated with the vehicle.

In another implementation form of the first aspect, the method further comprises, before causing transmission of the elevator call, causing transmission of information indicating an approaching passenger to enable parking optimization of at least one elevator based on the information indicative of a location based on the information indicative of the location.

In another implementation form of the first aspect, the information indicative of the location comprises at least one of: positioning system location information; short-range wireless communication associated information, wireless local area network associated information, vehicle identification information; user identification information, and access reader information.

In another implementation form of the first aspect, causing transmission of the elevator call comprises causing transmission of the elevator call to a cloud service.

In another implementation form of the first aspect, the method is performed by the vehicle.

In another implementation form of the first aspect, the method is performed by a mobile device application.

According to a second aspect, there is provided an apparatus for transmitting an elevator call. The apparatus comprises means for identifying a predetermined triggering event associated with a status of a vehicle, and means for causing transmission of the elevator call based on the predetermined triggering event associated with the status of the vehicle.

In an implementation form of the second aspect, the predetermined triggering event comprises a disconnection of a wireless connection between a mobile device and a vehicle system.

In another implementation form of the second aspect, the predetermined triggering event comprises a change in a locking status of doors of the vehicle.

In another implementation form of the second aspect, the predetermined triggering event comprises information identifying an arrival of the vehicle to a parking space.

In another implementation form of the second aspect, the information identifying the arrival of the vehicle to the parking space comprises information originating from a weighing arrangement.

In another implementation form of the second aspect, the apparatus further comprises means for obtaining information identifying the number of passengers associated with the vehicle, and wherein means for causing transmission of the elevator call are configured to cause the transmission of the elevator call based on the predetermined triggering event associated with the vehicle and the information identifying the number of passengers associated with the vehicle.

In another implementation form of the second aspect, the apparatus further comprises means for obtaining information identifying the number of passengers, and wherein means for causing transmission of the elevator call are configured to cause the transmission of the elevator call based on the predetermined triggering event associated with the vehicle and the information identifying the number of passengers.

In another implementation form of the second aspect, the apparatus further comprises means for obtaining information indicative of a location; and wherein means for causing transmission of the elevator call are configured to cause the transmission of the elevator call based on the information indicating of the location and the predetermined triggering event associated with the vehicle.

In another implementation form of the second aspect, the apparatus further comprises means for causing transmission of information indicating an approaching passenger before causing transmission of the elevator call, to enable parking optimization of at least one elevator based on the information indicative of the location.

In another implementation form of the second aspect, the information indicative of the location comprises at least one of: positioning system location information, short-range wireless communication associated information, wireless local area network associated information, vehicle identification information, user identification information, and access reader information.

In another implementation form of the second aspect, the means for causing transmission of the elevator call are configured to cause the transmission of the elevator call to a cloud service.

According to a third aspect, there is provided a vehicle comprising the apparatus of the second aspect.

According to a fourth aspect, there is provided a mobile device comprising the apparatus of the second aspect.

According to a fifth aspect, there is provided a computer program comprising program code, which when executed by at least one processing unit, causes the at least one processing unit to perform the method of the first aspect.

According to a sixth aspect, there is provided a computer readable medium comprising program code, which when executed by at least one processor, causes the at least one processor to perform the method of the first aspect.

According to a seventh aspect, there is provided an apparatus for transmitting an elevator call. The apparatus comprises at least one processor, and at least one memory connected to the at least one processor. The at least one memory stores program instructions that, when executed by the at least one processor, cause the apparatus to identify a predetermined triggering event associated with a status of a vehicle; and cause transmission of the elevator call based on the predetermined triggering event associated with the status of the vehicle.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a solution that aims to provide a flexible demand response resource for balancing the power grid.

Figure 1A:
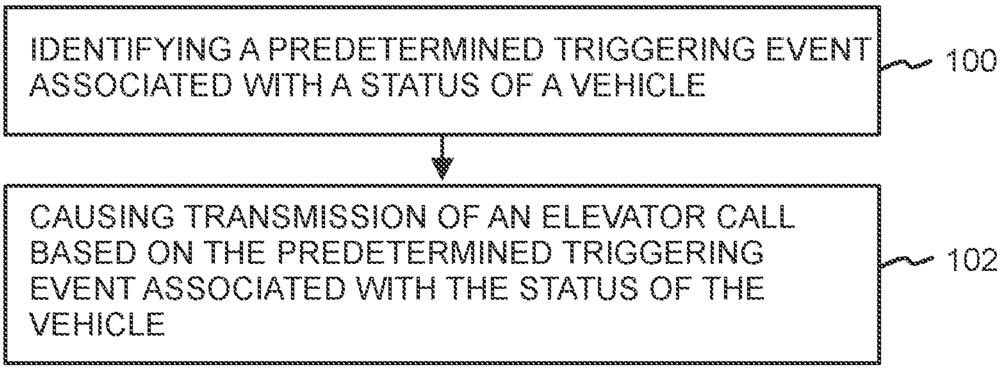
FIG. 1A illustrates a flow chart of a method for causing transmission of an elevator call according to an aspect.

FIG. 1A illustrates a flow chart of a method for causing transmission of an elevator call according to an aspect.

At 100 a predetermined triggering event associated with a status of a vehicle is identified. In an example embodiment, the triggering event associated with the status of the vehicle may comprise, for example, a disconnection of a wireless connection between a mobile device and a vehicle system. For example, there may be a short-range wireless connection, for example, a Bluetooth connection, between the mobile device and the vehicle, and once the distance between the mobile device and the vehicle reaches a certain point, the short-range wireless connection is disconnected between the mobile device and the vehicle system. The vehicle system may comprise, for example, an audio system or a multimedia system of the vehicle. When the short-range wireless connection disconnects between the mobile device and the vehicle system, it may be interpreted so that the driver has left his vehicle. In another example embodiment, the predetermined triggering event may comprise a change in a locking status of doors of the vehicle. The locking status may refer, for example, that the driver locks the doors of the vehicle when leaving the vehicle to a parking space or when the locks of the vehicle lock automatically when the drives leaves the vicinity of the vehicle.

In another example embodiment, the predetermined triggering event may comprise information identifying an arrival of the vehicle to a parking space. The information identifying the arrival of the vehicle to the parking space may be obtained, for example, with a weighing arrangement associated with the parking space or with a sensor, for example, an optical sensor, monitoring whether the parking space is in use or not. The mobile device or the vehicle may receive information from the weighing arrangement or the sensor that the vehicle is now located at the parking space. In another example embodiment, the mobile device or the vehicle may deduce based on location and a signal from at least one sensor, for example, an acceleration sensor, that a drive of the vehicle has become to an end at a specific location. This may be interpreted as the predetermined triggering event.

At 102, transmission of the elevator call is caused based on the predetermined triggering event associated with the status of the vehicle. The elevator call may be sent to a cloud service over a wireless communication network, for example, a local wireless area network connection or a mobile communication network connection.

The elevator call may be a floor call from a predetermined floor. Alternatively, the elevator call may be a destination call to a predetermined floor. The predetermined floor may be, for example, pre-programmed by the user of the mobile device or the vehicle.

In an example embodiment, the steps discussed above may be performed by a mobile device or a mobile device application. For example, the mobile device or mobile device application may identify the predetermined triggering event by obtaining information about the predetermined triggering event from the vehicle. Alternatively, the mobile device or mobile device application may identify the predetermined triggering event based on information obtained internally from the mobile device when, for example, the short-range wireless connection between the mobile device and the vehicle disconnects. In another example embodiment, the steps discussed above may be performed by the vehicle. In other words, the elevator call may originate either from the mobile device or the vehicle. In another example embodiment, a monitoring module connected to the weighing arrangement and/or sensor arranged in connection with the parking space may be configured to cause transmission of the elevator call. Alternatively, the monitoring module may transmit a signal to a service provided by a cloud service, and the service may cause transmission of the elevator call.

In an example embodiment, before causing transmission of the elevator call, it is possible to cause a transmission of information indicating an approaching passenger to enable parking optimization of at least one elevator based on the information indicative of the location. By enabling the parking optimization, one or more elevators may be parked at appropriate locations prior to receiving actual elevator calls.

Figure 1B:
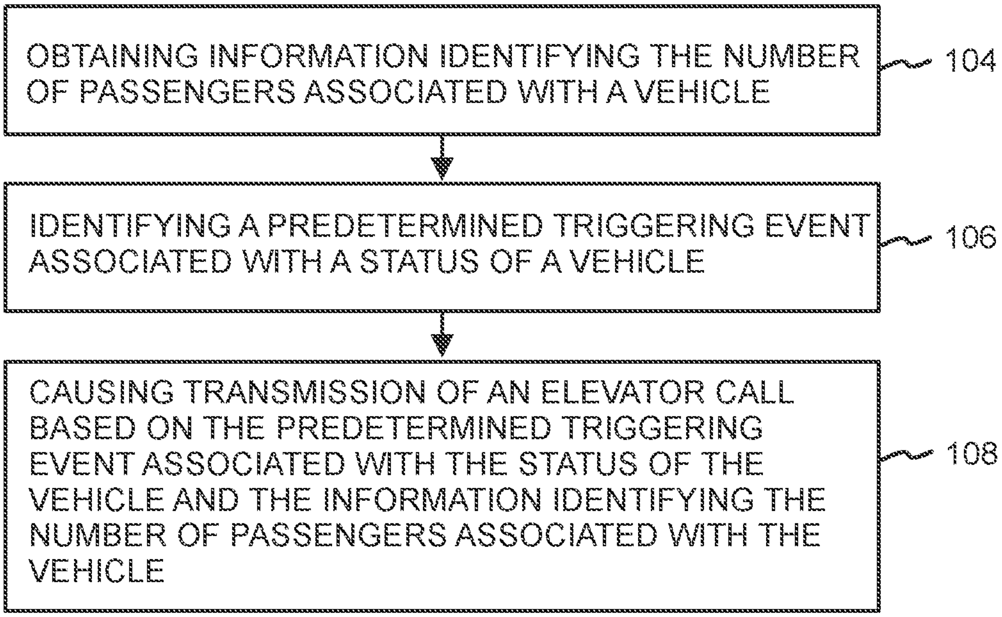
FIG. 1B illustrates a flow chart of a method for causing transmission of an elevator call according to another aspect.

FIG. 1B illustrates a flow chart of a method for causing transmission of an elevator call according to another aspect.

At 104 information identifying the number of passengers associated with a vehicle is obtained. The vehicle may be arriving to a location, for example, to a residential building or an office building, at which elevator service is available. At some point of the arrival, the information identifying the number of passengers may be obtained. The information may be determined based on one or more factors, for example, based on at least one of the following:

- Information from a weighing arrangement. When the vehicle arrives at a parking space, all the passengers are still in the car and the weighing arrangement associated with the parking space provides a first reading. A second, lower reading may be obtained when the passengers have exited the vehicle. By subtracting the second reading from the first reading, a weight corresponding to the exited passenger is obtained, and the number of passengers may be estimated based on this weight.
- The number of mobile phones connected to an audio system or a multimedia system of the vehicle.
- Data obtained by an internal camera associated with the vehicle. The number of passengers may be determined, for example, based on facial recognition.
- Vehicle sensor information. The sensor information may refer, for example, to seat sensor information obtained from seat sensors of the vehicle.
- Audio information obtained with at least one microphone. Audio characteristics of persons travelling in the vehicle are different, and this can be used in determining the number of passengers. The audio information may also identify closing sounds of at least one door, and this can be used in determining the number of passengers.
- Prestored information stored in the vehicle or a mobile device, indicating an average number of passengers arriving to a building. The average number of passengers may be different for different buildings (for example, residential building, office building etc.).

At 106 a predetermined triggering event associated with a status of a vehicle is identified. In an example embodiment, the triggering event associated with the status of the vehicle may comprise, for example, a disconnection of a wireless connection between a mobile device and a vehicle system. For example, there may be a short-range wireless connection, for example, a Bluetooth connection, between the mobile device and the vehicle, and once the distance between the mobile device and the vehicle reaches a certain point, the short-range wireless connection is disconnected between the mobile device and the vehicle system. The vehicle system may comprise, for example, an audio system or a multimedia system of the vehicle. When the short-range wireless connection disconnects between the mobile device and the vehicle system, it may be interpreted so that the driver has left his vehicle. In another example embodiment, the predetermined triggering event may comprise a change in a locking status of doors of the vehicle. The locking status may refer, for example, that the driver locks the doors of the vehicle when leaving the vehicle to a parking space or when the locks of the vehicle lock automatically when the drives leaves the vicinity of the vehicle.

In another example embodiment, the predetermined triggering event may comprise information identifying an arrival of the vehicle to a parking space. The information identifying the arrival of the vehicle to the parking space may be obtained, for example, with a weighing arrangement associated with the parking space or with a sensor, for example, an optical sensor, monitoring whether the parking space is in use or not. The mobile device or the vehicle may receive information from the weighing arrangement or the sensor that the vehicle is now located at the parking space. In another example embodiment, the mobile device or the vehicle may deduce based on location and a signal from at least one sensor, for example, an acceleration sensor, that a drive of the vehicle has become to an end at a specific location. This may be interpreted as the predetermined triggering event.

At 108, transmission of the elevator call is caused based on the predetermined triggering event associated with the status of the vehicle and the information identifying the number of passengers associated with the vehicle. The elevator call may be sent to a cloud service over a wireless communication network, for example, a local wireless area network connection or a mobile communication network connection. In another example embodiment, the elevator call may be sent directly to a controller controlling the nearby elevators.

The elevator call may be a floor call from a predetermined floor. Alternatively, the elevator call may be a destination call from a predetermined floor to a predetermined floor. When the information about the number of passenger associated with the vehicle is available, this information can be used in connection with the destination call. The predetermined floor may be, for example, pre-programmed by the user of the mobile device or vehicle.

In an example embodiment, the steps discussed above may be performed by a mobile device or a mobile device application. For example, the mobile device or mobile device application may identify the predetermined triggering event by obtaining information about the predetermined triggering event from the vehicle. Alternatively, the mobile device or mobile device application may identify the predetermined triggering event based on information obtained internally from the mobile device when, for example, the short-range wireless connection between the mobile device and the vehicle disconnects. In another example embodiment, the steps discussed above may be performed by the vehicle. In other words, the elevator call may originate either from the mobile device or the vehicle. In another example embodiment, a monitoring module connected to the weighing arrangement and/or sensor arranged in connection with the parking space may be configured to cause transmission of the elevator call. Alternatively, the monitoring module may transmit a message to a service provided by a cloud service, and the service may cause transmission of the elevator call. The message may also comprise an indication of the number of passengers associated with the vehicle.

In an example embodiment, before causing transmission of the elevator call, it is possible to cause a transmission of information indicating an approaching passenger to enable parking optimization of at least one elevator based on the information indicative of the location. By enabling the parking optimization, one or more elevator may be parked at appropriate locations prior to receiving actual elevator calls.

Figure 1C:
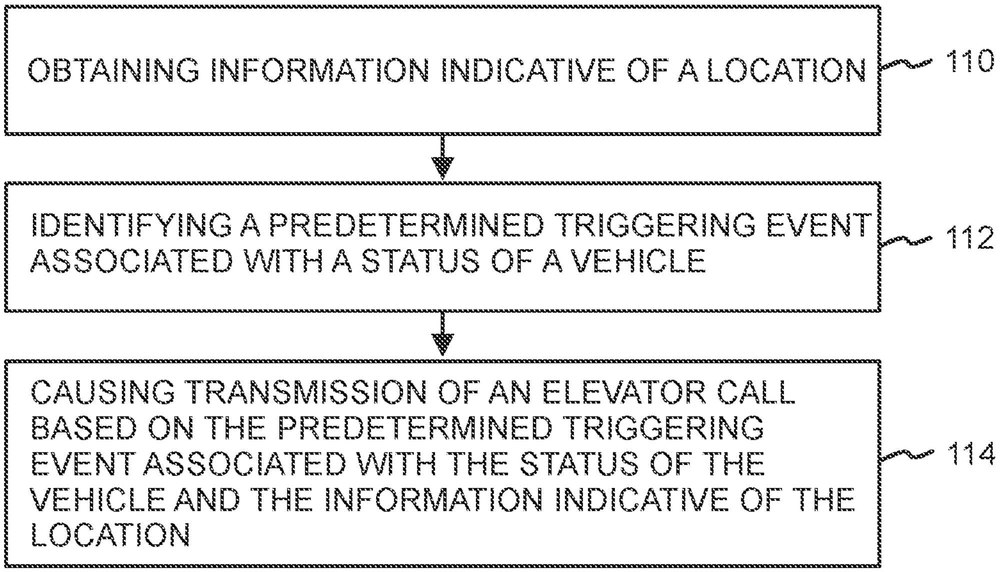
FIG. 1C illustrates a flow chart of a method for causing transmission of an elevator call according to another aspect.

FIG. 1C illustrates a flow chart of a method for causing transmission of an elevator call according to another aspect.

At 110 information indicative of a location is obtained. The information may directly indicate location of a passenger or a vehicle, and it may comprise, for example, satellite positioning system location data or data associated with another positioning system solution, for example, positioning system solution within a building. In another example embodiment, alternatively or additionally, the information indicative of the location may comprise indirect data based on which the location can be determined. The term "indirect data" may refer to data based on which it is possible to determine the location of the passenger or the vehicle. The indirect data may comprise data on at least one of the following:

- short-range wireless communication associated information;
- wireless local area network associated information;
- vehicle identification information;
- user identification information; and
- access control information.

The user identification, vehicle identification and/or access control may be performed with specific means, for example, one or more sensors (for example, an optical sensor, a camera, wireless identification sensor etc.). The specific means may have a known location, and this location, or the location information obtained using a positioning system location solution, may identify the building or section at the building where the user is or is approaching. Similarly, the short-range wireless communication and wireless location area network communication may involve a wireless station at a specific location in a building. Further, when the building, the section of the building or location at the building is known, a predetermined floor and elevator or elevator group may have been associated with the building or the section.

In an example embodiment, information identifying the number of passengers associated with a vehicle may be obtained. The vehicle may be arriving to a location, for example, to a residential building or an office building, at which elevator service is available. At some point of the arrival, the information identifying the number of passengers may be obtained. The information may be determined based on one or more factors, for example, based on at least one of the following:

- Information from a weighing arrangement. When the vehicle arrives at a parking space, all the passengers are still in the car and the weighing arrangement associated with the parking space provides a first reading. A second, lower reading may be obtained when the passengers have exited the vehicle. By subtracting the second reading from the first reading, a weight corresponding to the exited passenger is obtained, and the number of passengers may be estimated based on this weight.
- The number of mobile phones connected to an audio system or a multimedia system of the vehicle.
- Data obtained by an internal camera associated with the vehicle. The number of passengers may be determined, for example, based on facial recognition.
- Vehicle sensor information. The sensor information may refer, for example, to seat sensor information obtained from seat sensors of the vehicle.
- Audio information obtained with at least one microphone. Audio characteristics of persons travelling in the vehicle are different, and this can be used in determining the number of passengers. The audio information may also identify closing sounds of at least one door, and this can be used in determining the number of passengers.
- Prestored information stored in the vehicle or a mobile device, indicating an average number of passengers arriving to a building. The average number of passengers may be different for different building (for example, residential building, office building etc.).

At 112 a predetermined triggering event associated with a status of a vehicle is identified. In an example embodiment, the triggering event associated with the status of the vehicle may comprise, for example, a disconnection of a wireless connection between a mobile device and a vehicle system. For example, there may be a short-range wireless connection, for example, a Bluetooth connection, between the mobile device and the vehicle, and once the distance between the mobile device and the vehicle reaches a certain point, the short-range wireless connection is disconnected between the mobile device and the vehicle system. The vehicle system may comprise, for example, an audio system or a multimedia system of the vehicle. When the short-range wireless connection disconnects between the mobile device and the vehicle system, it may be interpreted so that the driver has left his vehicle. In another example embodiment, the predetermined triggering event may comprise a change in a locking status of doors of the vehicle. The locking status may refer, for example, that the driver locks the doors of the vehicle when leaving the vehicle to a parking space or when the locks of the vehicle lock automatically when the drives leaves the vicinity of the vehicle.

In another example embodiment, the predetermined triggering event may comprise information identifying an arrival of the vehicle to a parking space. The information identifying the arrival of the vehicle to the parking space may be obtained, for example, with a weighing arrangement associated with the parking space or with a sensor, for example, an optical sensor, monitoring whether the parking space is in use or not. The mobile device or the vehicle may receive information from the weighing arrangement or the sensor that the vehicle is now located at the parking space. In another example embodiment, the mobile device or the vehicle may deduce based on location and a signal from at least one sensor, for example, an acceleration sensor, that a drive of the vehicle has become to an end at a specific location. This may be interpreted as the predetermined triggering event.

At 114, transmission of the elevator call is caused based on the predetermined triggering event associated with the status of the vehicle and the information identifying of the location. If information about the number of passenger is available, the elevator call may be based also on this information. The elevator call may be sent to a cloud service over a wireless communication network, for example, a local wireless area network connection or a mobile communication network connection. In another example embodiment, the elevator call may be sent directly to a controller controlling the nearby elevators.

The location may identify, for example, a residential building or an office building, at which elevator service is available. As the location information is available, the elevator call may be a floor call from a predetermined floor. Alternatively, the elevator call may be a destination call from a predetermined floor to a predetermined floor. The predetermined floor for the floor call or predetermined floors for the destination call may be, for example, pre-programmed by the user of the mobile device or vehicle.

In an example embodiment, the steps discussed above may be performed by a mobile device or a mobile device application. For example, the mobile device or mobile device application may identify the predetermined triggering event by obtaining information about the predetermined triggering event from the vehicle. Alternatively, the mobile device or mobile device application may identify the predetermined triggering event based on information obtained internally from the mobile device when, for example, the short-range wireless connection between the mobile device and the vehicle disconnects. In another example embodiment, the steps discussed above may be performed by the vehicle.

In other words, the elevator call may originate either from the mobile device or the vehicle. In another example embodiment, a monitoring module connected to the weighing arrangement and/or sensor arranged in connection with the parking space may be configured to cause transmission of the elevator call. Alternatively, the monitoring module may transmit a message to a service provided by a cloud service, and the service may cause transmission of the elevator call. The message may also comprise an indication of the number of passengers associated with the vehicle In an example embodiment, before causing transmission of the elevator call, it is possible to cause a transmission of information indicating an approaching passenger to enable parking optimization of at least one elevator based on the information indicative of the location. By enabling the parking optimization, one or more elevator may be parked at appropriate locations prior to receiving actual elevator calls.

Figure 2A:
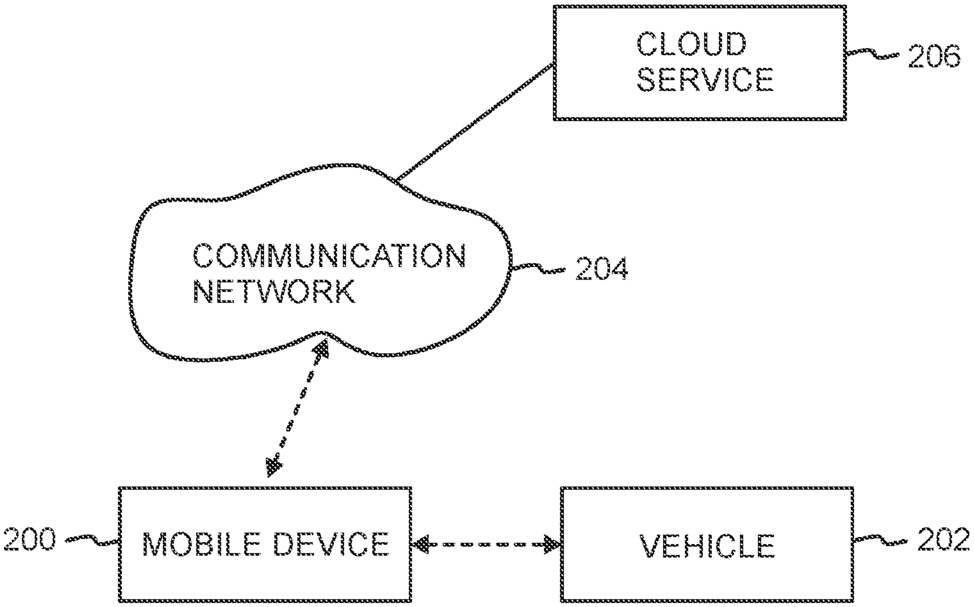
FIG. 2A illustrates system elements that may be involved in causing transmission of an elevator call in an example embodiment.

FIG. 2A illustrates system elements that may be involved in causing transmission of an elevator call in an example embodiment. The system comprises a mobile device 200, for example, a smart phone that may have a wireless connection to a vehicle 202. There may be a wireless connection, for example, a Bluetooth connection, between the mobile device 200 and the vehicle 202. Via the wireless connection, the mobile device 200 may be able to control the vehicle 202 and/or to receive information from the vehicle 202, for example, about the predetermined triggering event associated with the status of the vehicle. The mobile device 200 may perform some or all of the steps discussed relating the example embodiments discussed in relation to any of FIGS. 1A-1C. The mobile device 200 or an application executed by the mobile device 200 may cause transmission of the elevator call to a cloud service 206 via a communication network 204, for example, a wireless local area network (WLAN) or a cellular communication network.

Figure 2B:
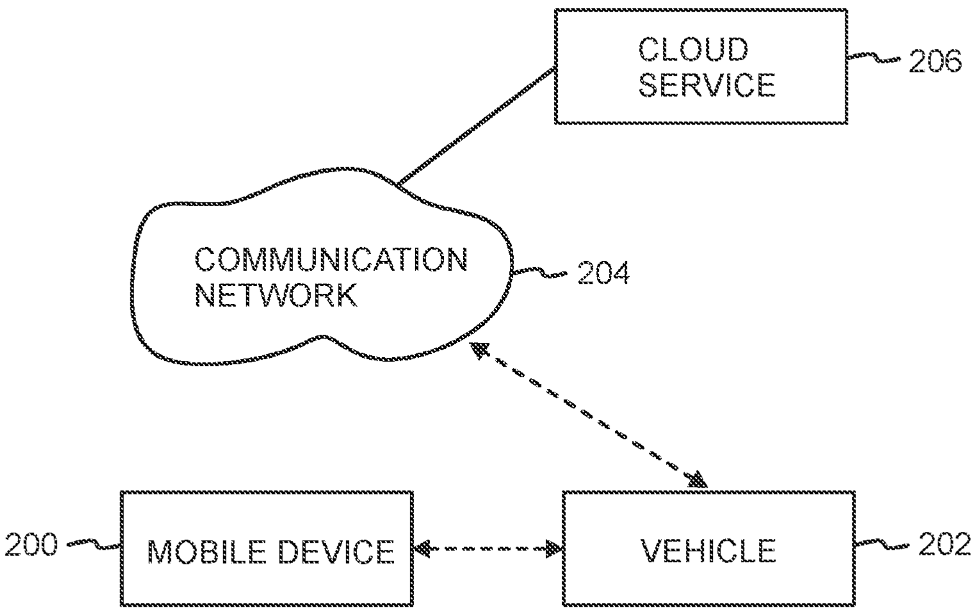
FIG. 2B illustrates system elements that may be involved in causing transmission of an elevator call in another example embodiment.

FIG. 2B illustrates system elements that may be involved in causing transmission of an elevator call in another example embodiment. The system comprises a mobile device 200, for example, a smart phone that may have a wireless connection to a vehicle 202. There may be a wireless connection, for example, a Bluetooth connection, between the mobile device 200 and the vehicle 202 via which the mobile device 200 and the vehicle 202 may exchange information. For example, when the wireless connection disconnects between the mobile device 200 and the vehicle 202, the vehicle 202 may use the disconnection as the predetermined triggering event associated with the status of the vehicle. The disconnection may be used as an indication that the user of the vehicle is about to use the elevator. The vehicle 202 may perform some or all of the steps discussed relating the example embodiments discussed in relation to any of FIGS. 1A-1C. The vehicle 202 or an application executed by a vehicle system may cause transmission of the elevator call to a cloud service 206 via a communication network 204, for example, a wireless local area network (WLAN) or a cellular communication network.

Figure 2C:
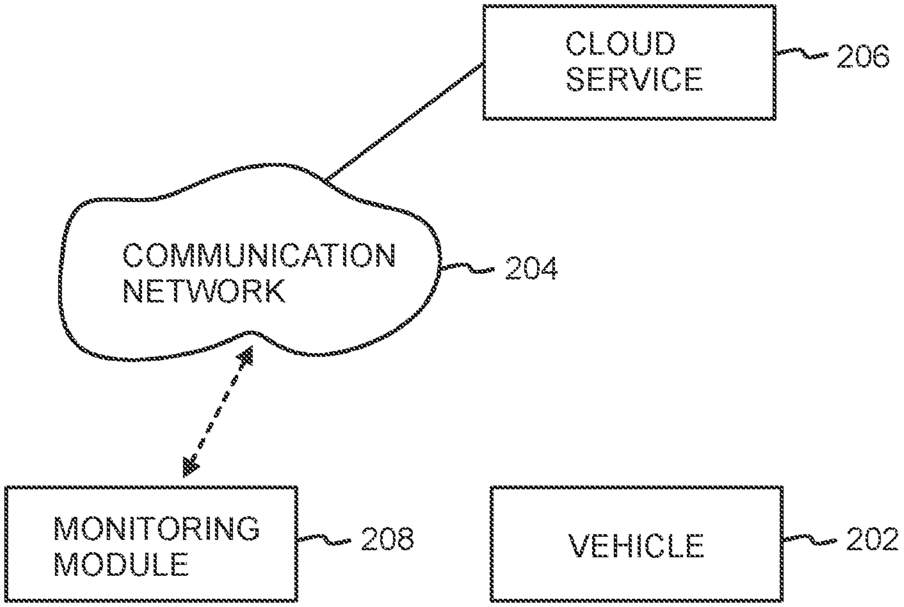
FIG. 2C illustrates system elements that may be involved in causing transmission of an elevator call in another example embodiment.

FIG. 2C illustrates system elements that may be involved in causing transmission of an elevator call in another example embodiment. The information identifying the arrival of the vehicle 202 to the parking space may be obtained, for example, with a monitoring module 208 that may be connected, for example, to the weighing arrangement associated with the parking space or with the sensor, for example, an optical sensor, monitoring whether the parking space is in use or not. The monitoring module 208 may be configured to cause transmission of the elevator call. Alternatively, the monitoring module 208 may transmit a message to a service provided by a cloud service, and the service may cause transmission of the elevator call. The message may also comprise an indication of the number of passengers associated with the vehicle 202.

Figure 2D:
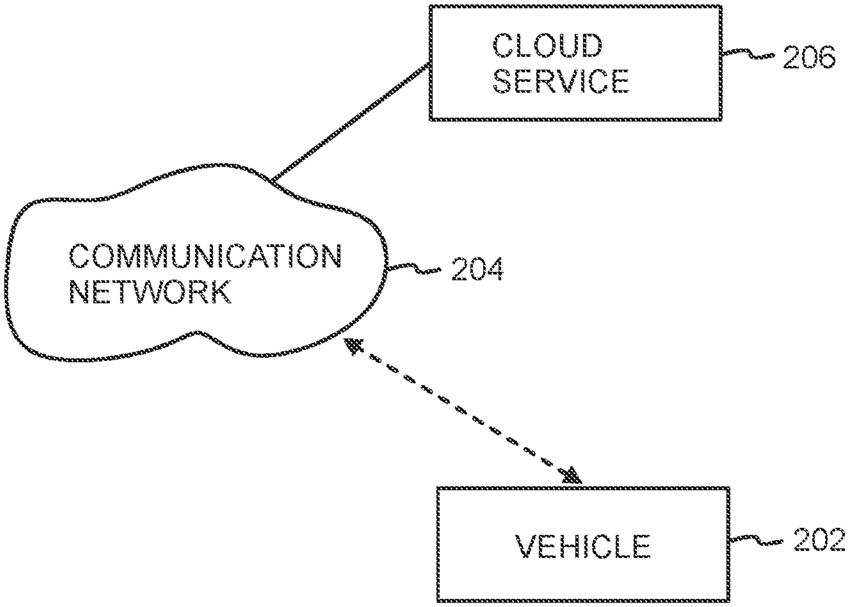
FIG. 2D illustrates system elements that may be involved in causing transmission of an elevator call in an example embodiment.

FIG. 2D illustrates system elements that may be involved in causing transmission of an elevator call in an example embodiment. The system comprises a vehicle 202 connected to a communication network 204. The vehicle 202 may perform some or all of the steps discussed relating the example embodiments discussed in relation to any of FIGS. 1A-1C. The vehicle 202 may cause transmission of the elevator call to a cloud service 206 via the communication network 204, for example, a wireless local area network (WLAN) or a cellular communication network.

Figure 3:
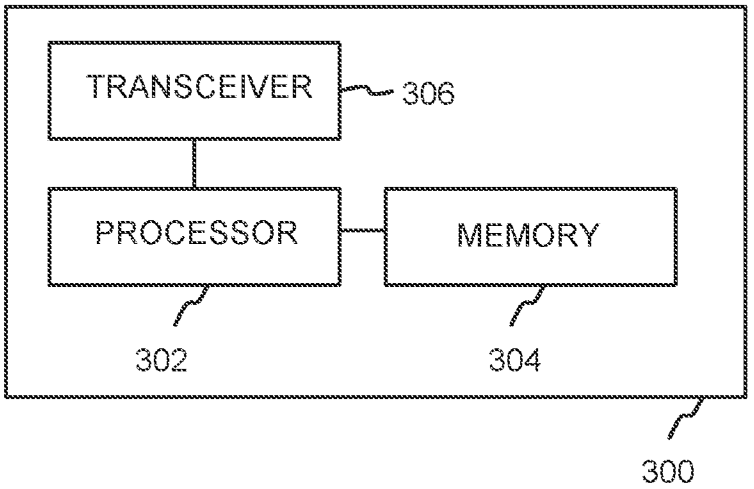
FIG. 3 illustrates a block diagram of an apparatus for transmitting an elevator call according to an aspect.

FIG. 3 illustrates a block diagram of an apparatus 300 for transmitting an elevator call according to an aspect.

The illustrated apparatus 300 can include at least one controller or processor 302 (e.g. signal processor, microprocessor, ASIC, or other control and processing logic circuitry) for performing such tasks as signal coding, data processing, input/output processing, power control, and/or other functions. The illustrated apparatus 300 can include a memory or memories 304. The memory 304 can include non-removable memory and/or removable memory. The non-removable memory can include RAM, ROM, flash memory, a hard disk, or other well-known memory storage technologies. The memory 304 can be used for storing data and/or code for running one or more applications.

The apparatus 300 may comprise at least one transceiver enabling the apparatus 300 to communicate with external devices or networks. The transceiver 306 can include at least one wired or wireless transceiver for communicating with the external devices or networks, for example, a short-range wireless communication transceiver, a wireless local area network transceiver, a mobile communication network transceiver etc. The memory 304 may store operating system software that controls the operations of the apparatus 300. The memory 304 may also comprise one or more applications that can be executed by the processor 302. The illustrated components of the apparatus 300 are not all-inclusive, as any components can deleted and other components can be added.

The memory 304 may comprise a computer program that, when executed by the processor 302, causes the apparatus 300 to identify a predetermined triggering event associated with a status of a vehicle, and cause transmission of the elevator call based on the predetermined triggering event associated with the status of the vehicle.

Further, any combination of the illustrated components disclosed in FIG. 3, for example, at least one of the processor 302 and the memory 304 may constitute means for identifying a predetermined triggering event associated with a status of a vehicle, and means for causing transmission of the elevator call based on the predetermined triggering event associated with the status of the vehicle.

Further, the apparatus 300 may be configured to implement some or all of the features discussed in relation to any of FIGS. 1A-1C.

In an example embodiment, the apparatus 300 may be a mobile device, for example, a smart phone, carried by the user. In another example embodiment, the apparatus 300 may be an apparatus arranged in a vehicle, and it may be connected to an information system of the vehicle. Further, in an example embodiment, the information system of the vehicle may be configured to implement one or more of the above discussed embodiments.

At least some of the embodiments discussed above may enable one or more of the followings effects. The illustrated solution may enable initiation of an elevator call without passenger actions based on a predetermined triggering event associated with a status of a vehicle. A variety of information associated with the vehicle may be used as the predetermined triggering event. This enables an outcome that an elevator is waiting at an elevator lobby, when the passenger arrives at the lobby.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for transmitting an elevator call, the method comprising:
identifying a predetermined triggering event associated with a status of a vehicle; and
causing transmission of the elevator call based on the predetermined triggering event associated with the status of the vehicle,
wherein the predetermined triggering event comprises at least one of a disconnection of a wireless connection between a mobile device and a vehicle system and a change in a locking status of doors of the vehicle.

2. The method of claim 1, wherein the predetermined triggering event comprises information identifying an arrival of the vehicle to a parking space.

3. The method of claim 2, wherein the information identifying the arrival of the vehicle to the parking space comprises information originating from a weighing arrangement.

4. The method of claim 2, further comprising:
obtaining information identifying the number of passengers associated with the vehicle,
wherein causing transmission of the elevator call comprises causing transmission of the elevator call based on the predetermined triggering event associated with the vehicle and the information identifying the number of passengers associated with the vehicle.

5. The method of claim 1, further comprising:
obtaining information identifying the number of passengers,
wherein causing transmission of the elevator call comprises causing transmission of the elevator call based on the predetermined triggering event associated with the vehicle and the information identifying the number of passengers.

6. The method of claim 1, further comprising:
obtaining information indicative of a location; and
wherein causing transmission of the elevator call comprises causing transmission of the elevator call based on the information indicative of the location and the predetermined triggering event associated with the vehicle.

7. The method of claim 6, further comprising:
before causing transmission of the elevator call, causing transmission of information indicating an approaching passenger to enable parking optimization of at least one elevator based on the information indicative of the location.

8. The method of claim 6, wherein the information indicative of the location comprises at least one of:
positioning system location information;
short-range wireless communication associated information;
wireless local area network associated information;
vehicle identification information;
user identification information; and
access reader information.

9. The method of claim 1, wherein causing transmission of the elevator call comprises causing transmission of the elevator call to a cloud service.

10. The method of claim 1, wherein the method is performed by the vehicle.

11. The method of claim 1, wherein the method is performed by a mobile device application.

12. A computer program comprising program code, which when executed by at least one processing unit, causes the at least one processing unit to perform the method of claim 1.

13. A non-transitory computer-readable medium comprising a computer program comprising program code, which when executed by at least one processing unit, causes the at least one processing unit to perform the method of claim 1.

14. An apparatus for transmitting an elevator call, the apparatus comprising:
means for identifying a predetermined triggering event associated with a status of a vehicle; and
means for causing transmission of the elevator call based on the predetermined triggering event associated with the status of the vehicle,
wherein the predetermined triggering event comprises at least one of a disconnection of a wireless connection between a mobile device and a vehicle system and a change in a locking status of doors of the vehicle.

15. The apparatus of claim 14, wherein predetermined triggering event comprises information identifying an arrival of the vehicle to a parking space.

16. The apparatus of claim 15, wherein the information identifying the arrival of the vehicle to the parking space comprises information originating from a weighing arrangement.

17. The apparatus of claim 15, further comprising:
means for obtaining information identifying the number of passengers associated with the vehicle,
wherein means for causing transmission of the elevator call are configured to cause the transmission of the elevator call based on the predetermined triggering event associated with the vehicle and the information identifying the number of passengers associated with the vehicle.

18. The apparatus of claim 14, further comprising:
means for obtaining information identifying the number of passengers,
wherein means for causing transmission of the elevator call are configured to cause the transmission of the elevator call based on the predetermined triggering event associated with the vehicle and the information identifying the number of passengers.

19. The apparatus of claim 14, further comprising:
means for obtaining information indicative of a location; and
wherein means for causing transmission of the elevator call are configured to cause the transmission of the elevator call based on the information indicating of the location and the predetermined triggering event associated with the vehicle.

20. The apparatus of any claim 19, further comprising:
means for causing transmission of information indicating an approaching passenger before causing transmission of the elevator call, to enable parking optimization of at least one elevator based on the information indicative of the location.

21. The apparatus of claim 19, wherein the information indicative of the location comprises at least one of:
positioning system location information;
short-range wireless communication associated information;
wireless local area network associated information;
vehicle identification information;

user identification information; and
access reader information.

22. The apparatus of claim 14, wherein means for causing transmission of the elevator call are configured to cause the transmission of the elevator call to a cloud service.

23. A vehicle comprising the apparatus of claim 14.

24. A mobile device comprising the apparatus of claim 14.

* * * * *